(12) United States Patent
Lubin et al.

(10) Patent No.: US 9,597,839 B2
(45) Date of Patent: Mar. 21, 2017

(54) SYSTEM FOR ADJUSTING OPERATION OF A PRINTER DURING THREE-DIMENSIONAL OBJECT PRINTING TO COMPENSATE FOR ERRORS IN OBJECT FORMATION

(71) Applicant: Xerox Corporation, Norwalk, CT (US)

(72) Inventors: Dara N. Lubin, Pittsford, NY (US);
John T. Buzzelli, Walworth, NY (US);
Ron E. Dufort, Rochester, NY (US);
Kevin St. Martin, Rochester, NY (US);
David B. Montfort, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 112 days.

(21) Appl. No.: 14/740,744

(22) Filed: Jun. 16, 2015

(65) Prior Publication Data
US 2016/0368219 A1 Dec. 22, 2016

(51) Int. Cl.
*B29C 47/92* (2006.01)
*B29C 67/00* (2006.01)
*B29K 105/00* (2006.01)
*B33Y 30/00* (2015.01)
*B33Y 50/02* (2015.01)

(52) U.S. Cl.
CPC ...... *B29C 67/0088* (2013.01); *B29C 67/0055* (2013.01); *B29K 2105/0058* (2013.01); *B33Y 30/00* (2014.12); *B33Y 50/02* (2014.12)

(58) Field of Classification Search
CPC ............ B29C 67/0088; B29C 67/0055; B29K 2105/0058; B33Y 30/00; B33Y 50/02
USPC .... 425/375, 174.4, 150; 264/40.1, 401, 308, 264/112
See application file for complete search history.

(56) References Cited

U.S. PATENT DOCUMENTS

| | | |
|---|---|---|
| 3,482,919 A | 12/1969 | Barringer |
| 3,796,495 A | 3/1974 | Laub |
| 4,089,607 A | 5/1978 | Rambauske |
| 4,139,302 A | 2/1979 | Hung et al. |
| 4,576,479 A | 3/1986 | Downs |
| 4,660,980 A | 4/1987 | Takabayashi et al. |
| 4,725,142 A | 2/1988 | Sharnoff |
| 5,061,070 A | 10/1991 | Batchelder et al. |
| 5,139,336 A | 8/1992 | See et al. |
| 5,398,113 A | 3/1995 | de Groot |
| 5,523,839 A | 6/1996 | Robinson et al. |
| 5,589,938 A | 12/1996 | Deck |

(Continued)

FOREIGN PATENT DOCUMENTS

CN 203587319 U 5/2014

OTHER PUBLICATIONS

Keysight Technologies; Transducer Systems; Aug. 2, 2014; 8 Pages; www.keysight.com/find/lasers; USA.

*Primary Examiner* — Nahida Sultana
(74) *Attorney, Agent, or Firm* — Maginot Moore & Beck LLP (57) ABSTRACT

A printer compensates for printing errors occurring during production of the layers for the formation of an object in a three-dimensional printer. The printer includes an optical sensor that generates data corresponding to edges of each layer of the object after each layer is printed. Differences between the raster data used to eject the material to form a layer and the data received from the optical sensor are used to modify the raster data that operates a printhead to form a next layer in the object.

10 Claims, 5 Drawing Sheets

(56) References Cited

U.S. PATENT DOCUMENTS

| | | |
|---|---|---|
| 5,900,937 A | 5/1999 | Wang |
| 6,094,260 A | 7/2000 | Rockstroh et al. |
| 6,205,315 B1 | 3/2001 | Montfort et al. |
| 6,249,351 B1 | 6/2001 | de Groot |
| 6,381,015 B1 | 4/2002 | Sonehara et al. |
| 7,019,841 B2 | 3/2006 | Mathur |
| 7,106,454 B2 | 9/2006 | De Groot et al. |
| 7,403,650 B2 | 7/2008 | Coulombe et al. |
| 8,452,074 B2 | 5/2013 | Tamamushi |
| 8,570,524 B2 | 10/2013 | Wan et al. |
| 8,643,845 B2 | 2/2014 | Shin et al. |
| 8,672,663 B2 * | 3/2014 | Tanabe ............... B82Y 10/00 264/293 |
| 8,678,808 B2 * | 3/2014 | Yoshida ............... B82Y 10/00 264/293 |
| 2003/0063267 A1 | 4/2003 | Novak et al. |
| 2005/0205781 A1 | 9/2005 | Kimba |
| 2007/0091317 A1 | 4/2007 | Freischlad et al. |
| 2007/0172111 A1 | 7/2007 | Ikeda |
| 2008/0169589 A1 * | 7/2008 | Sperry ............... B29C 67/0096 264/494 |
| 2013/0015596 A1 | 1/2013 | Mozeika et al. |
| 2013/0101803 A1 * | 4/2013 | Grebe ............... B29C 67/007 428/172 |
| 2014/0107959 A1 | 4/2014 | Kimba et al. |
| 2015/0022817 A1 | 1/2015 | Kay |
| 2015/0290712 A1 * | 10/2015 | Bamberg ............... B33Y 30/00 419/53 |
| 2015/0367416 A1 * | 12/2015 | Buller ............... B23K 26/346 419/53 |
| 2016/0271875 A1 * | 9/2016 | Brown, Jr. ......... B29C 67/0066 |

* cited by examiner

SYSTEM FOR ADJUSTING OPERATION OF A PRINTER DURING THREE-DIMENSIONAL OBJECT PRINTING TO COMPENSATE FOR ERRORS IN OBJECT FORMATION

TECHNICAL FIELD

The device disclosed in this document relates to printers that produce three-dimensional objects and, more particularly, to the accurate production of objects with such printers.

BACKGROUND

Three-dimensional printing is a process of making a three-dimensional solid object of virtually any shape from a digital model. One approach to three-dimensional printing uses an additive process in which one or more printheads eject successive layers of material in different shapes on a substrate. This approach to three-dimensional printing is also known as additive manufacturing. The substrate is supported on a platform that can be moved in one, two, or three dimensions by operation of actuators operatively connected to the platform. Additionally or alternatively, the printhead or printheads are also operatively connected to one or more actuators for controlled movement of the printhead or printheads to produce the layers that form the three-dimensional object. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is inconsistency between the actual dimensions of the printed part and the intended dimensions of the printed parts. These inconsistencies arise because the ejected ink material can flow away from its intended position when jetting onto the growing part. Other factors include thermal expansion and contraction of the material as hot material is ejected onto the part and then cooled or cured. During printing of an object, one or more inkjets can deteriorate by ejecting the material at an angle, rather than normal, to the printhead, ejecting drops that are smaller or larger than an inkjet should eject, or by failing to eject any drop at all. Other sources of error that occur during object printing include mechanical runout, mechanical shrinkage of the ejected material, vibration, and the like. Dimensional accuracy of an object is currently controlled by monitoring and verifying the accuracy of the movement of the support platform and the printhead or printheads. The sources of error identified above, may not be detected from the monitoring of the support platform or printhead(s) movement. If one or more of these sources for error accumulate during object printing, the quality of the printed object may require the object to be scrapped. Because the print jobs can require many hours or multiple days to produce objects, this scrapping of objects can be expensive and time consuming. A printer capable of detecting errors in an object being produced and correcting them during printing would be advantageous.

Another issue that arises in additive manufacturing is the production of tuned vibratory components. For example, transducers can be produced using three-dimensional manufacturing systems. These components, however, need structure to be added or removed from them so they vibrate in a range about a predetermined frequency and velocity set point. The process for tuning the transducer requires removal of the transducer from the manufacturing system to a test fixture, where the transducer is coupled to electrical power and operated to enable measurements of the transducer vibration characteristics to be made. These measurements are then used to determine where material can be added or removed to alter the frequency, velocity, or both at which the transducer vibrates. Significant time savings and manufacturing process efficiency could be gained if the transducers could be tested in the manufacturing environment and adjustments could be made while the transducer is being manufactured.

SUMMARY

A three-dimensional object printing system includes one or more interferometers that are used to measure features of an object being printed and these measurements are compared to data corresponding to the finished object to modify formation of the object and compensate for defects detected from the comparison. The system includes a planar member, at least one ejector configured to eject material towards the planar member to form an object on the planar member, at least one interferometer that generates signals corresponding to distances between positions in a surface of the object being formed on the planar member, the interferometer being oriented differently than the ejector with reference to the object being formed on the planar member, a material remover configured to remove material from the object being formed on the planar member, and a controller operatively connected to the at least one interferometer, the ejector, and the material remover. The controller is configured to: operate the ejector to form the object on the planar member, compare the distances between positions on the surface of the object being formed on the planar member that correspond to the signals received from the at least one interferometer to data corresponding to a plurality of views of the object being formed on the planar member, identify a position on the object being formed on the planar member where material is to be removed or added to the object being formed on the planar member in response to the comparison of the distances and the data corresponding to the plurality of views exceeds a predetermined threshold, and operate the material remover or the ejector to remove or add material to the object being formed on the planar member at the identified position to modify positions on the surface of the object being formed on the planar member to positions identified in the data corresponding to the plurality of views.

A three-dimensional object printing system configured to produce vibratory components enables the components to be coupled to electrical power so measurements of the component's vibrations can be obtained and compared to a range about a predetermined velocity set point. If the measured vibrations are not within the predetermined range, the system adds or removes material from the object to tune to the vibratory component to the target range. The vibratory component tuning system includes a member configured for mounting a vibratory component, an interferometer that generates signals corresponding to changes in a surface of the vibratory component as the vibratory component is operated to vibrate, an actuator operatively connected to the interferometer and configured to move the interferometer along the vibratory component mounted to the member as the vibratory component is operated to vibrate, an ejector configured to eject material that adheres to the vibratory component mounted to the member, a material remover configured to remove material from the vibratory component mounted to the member, and a controller operatively connected to the interferometer, the actuator, the ejector, and the material remover. The controller is configured to operate the vibratory component mounted to the member, operate the actuator to move the interferometer along the surface of the vibratory component, generate a velocity profile corresponding to vibration of the vibratory component at a plurality of positions along the vibratory component, identify a position on the vibratory component where material is to be removed or added to the vibratory component, and operate the material remover to remove material or the ejector to add material to the vibratory component at the identified position to tune the vibratory component to enable the vibratory component to vibrate at a predetermined frequency and velocity set point.

BRIEF DESCRIPTION OF THE DRAWINGS

The foregoing aspects and other features of a printing system that compensates for object printing errors during three-dimensional object printing and of a printing system that enables vibratory components to be tuned are explained in the following description, taken in connection with the accompanying drawings.

DETAILED DESCRIPTION

For a general understanding of the environment for the device disclosed herein as well as the details for the device, reference is made to the drawings. In the drawings, like reference numerals designate like elements.

Figure 5:
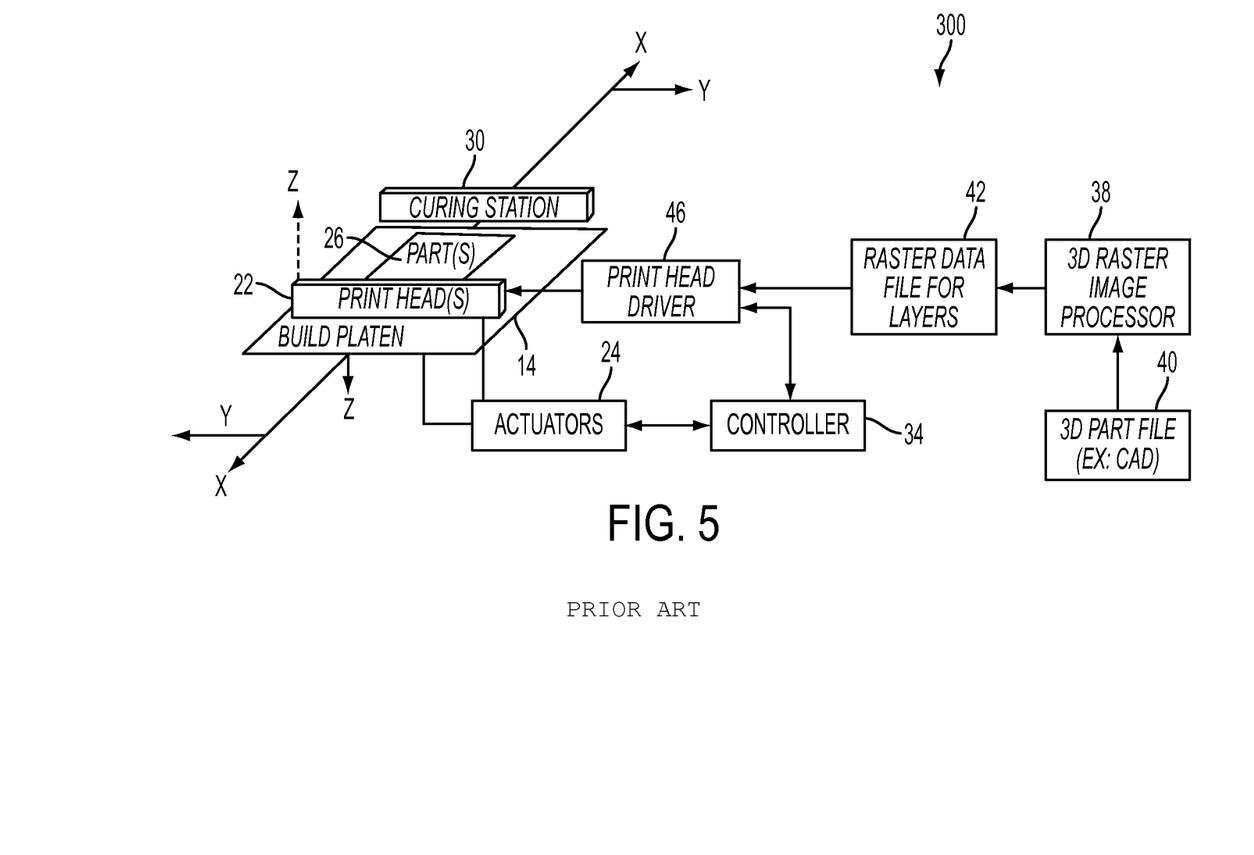
FIG. 5 is a block diagram of a prior art three-dimensional object printer.

FIG. 5 shows a configuration of components in a prior art printer 300, which produces a three-dimensional object or part 26. The printer 300 includes a support platen 14 on which one or more printheads 22 form an object or part 26. The printhead(s) are configured to eject one or more types of build material and support material to form the part 26. These materials can require curing so the printer 300 includes a curing device 30. In some embodiments that eject photopolymer building material, the curing device 30 is an ultraviolet (UV) radiation source. Additionally, a planerizer (not shown) can be included to normalize the height of material in a layer formed on the object by the one or more printheads 22.

The printhead(s) 22 and support platen 14 are configured with actuators 24 and the like for movement. As shown in the figure, the support platen 14 is configured for movement along an X-axis and the printhead(s) are configured to move along a Z axis, although the platen 14 could also be configured for movement along the Z axis. The movement of the platen 14 and the printhead(s) 22 is coordinated by a controller 34, which is operatively connected to the actuators 24 that move the platen and printhead(s). In the figure, the printhead(s) 22 are wider along a Y axis than the part being built. Consequently, movement along the Y axis is not required. In some embodiments, the printhead(s) are not wider than the part so the platen 14 or the printhead(s) 22 can be configured for movement along the Y axis. In other embodiments, the resolution of the ejectors in the printheads is less than the resolution required for the part. In these embodiments movement is also needed along the Y axis to build up a layer at the resolution required for the part. As used herein, the term "process direction" refers to movement along one axis in the plane of the upper surface of the support platen 14 and "cross-process direction" refers to movement along an axis in the support platen 14 that is orthogonal to the process direction axis in the plane of the platen. Thus, the process and cross-process directions in FIG. 5 refer to the X and Y axes. While the platen 14 of FIG. 5 is shown as a planar member, other embodiments of three-dimensional printers include platens that are circular discs, an inner wall of a rotating cylinder or drum, or a rotating cone. The movement of the platen and the printhead(s) in these printers can be described with polar coordinates.

To operate the ejectors in the printhead(s), a three-dimensional raster processor 38 receives a file 40 of three-dimensional data of the part to be produced. These three-dimensional part data can be contained in a computer-aided design (CAD) file, for example. The processor 38 uses these data to generate a raster data file 42, which contains data that correspond to thin layers of the part. The printhead driver 46 receives the raster data file 42 and generates pixelated data that are used to operate the ejectors in the printhead(s) 22 for the ejection of building and support material onto the support platen 14 to form the part 26 layer by layer. The printhead driver 46 and the controller 34 generate signals to coordinate the movement of the platen 14 and the printhead(s) 22 with the operation of the ejectors in the printhead(s) 22.

As noted above, movement of the platen and printhead(s) in a prior art printer, such as printer 300, is monitored with encoders and the like to enable the controller 34 to control the positioning of those components accurately. Other sources of positional error, either in the components moving the platen and the printhead(s) or in the placement of the drops ejected by the printhead(s) are not detected and can accumulate to a total error that requires the scrapping of the part. Additional contributors to positional error include changes and distortions in the part due to contraction and expansion of the part occurring as the part continues to cool after a layer is deposited, the layer is reheated as the subsequent layers are built up, or by the chemistry arising from the curing of the materials in a layer. The magnitude of these contractions and expansions may change as the part is built up because the ability of the part to absorb additional heat changes as the size of the part increases. In printers having a planerizer, inaccuracy in the operation of the planerizer can also contribute to positional error in a layer of an object.

Figure 1:
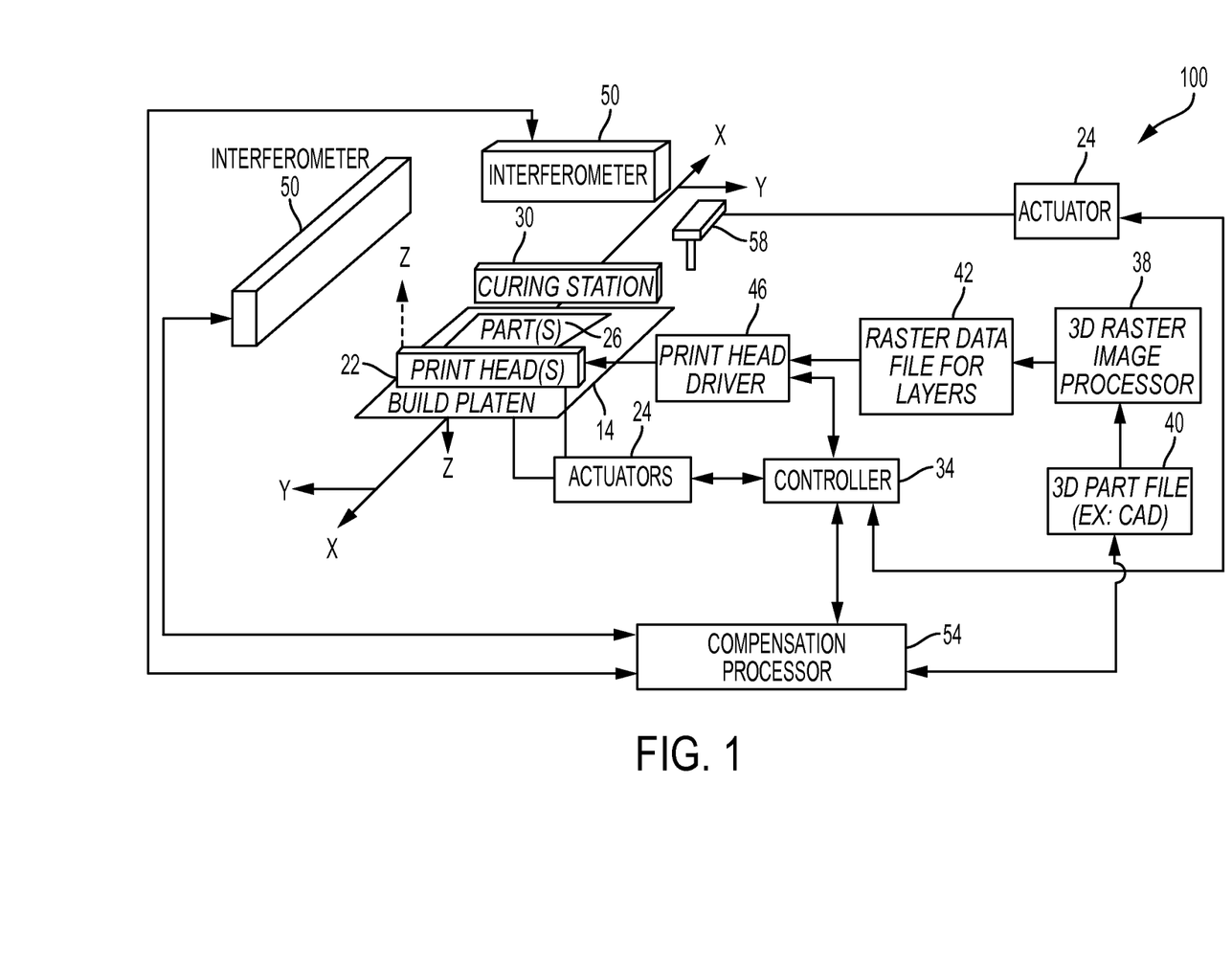
FIG. 1 is block diagram of a three-dimensional object printer that detects object printing errors and compensates for the errors during the object printing operation.

To address these other sources of error, a printer has been developed that detects errors in the formation of the part while the part is being printed and compensates for these errors. One embodiment of such a printer is shown in FIG. 1. Using like reference numerals for like components, the printer 100 includes a platen 14, printhead(s) 22, curing device 30, a controller 34, a raster image processor 38 that generates a raster data file 42, a printhead driver 46, interferometers 50 a compensation processor 54, and a material remover 58.

The interferometers 50 are laser interferometers. In a laser interferometer, a beam of light is split so one of the beam is transmitted towards an object and the other half is reflected. The split beams are recombined with the wave interference between the two beams being constructive or destructive. This interference can be measured to identify structural dimensions of the features that reflected one-half of the light beam. Since the wavelength of the laser beam is very small, the accuracy of the measurements can have a high resolution. The measurements of the surface displacement are called collectively a surface profile in this document and are compared to a file of data corresponding to the finished object. In addition, for the balance calibration described below, the laser interferometers measure vibration characteristics, such as frequency and velocity of the tip of the transducers. Differences between the measurements and the data file identify errors in the formation of the object and these identified errors can be used to correct the formation of object by either adding material to the object or removing material from the object.

The measurement data from each interferometer 50 are provided to the compensation processor 54. The compensation processor 54 compares the data from each interferometer 50 with the image data in the CAD file 40 for the view of the part 26 in the CAD data that corresponds to the orientation of the interferometer with reference to the object. As is known, CAD data can be manipulated to display an object from different perspectives. By comparing the interferometer data to the image data in the CAD data that corresponds to the view of the interferometer, differences between these data can be identified. The compensation processor 54 uses these differences to operate the material remover 58 or one of the printheads 22 to either remove excess material from or add missing material to the object, respectively. To add material, the compensation processor 54 generates raster data that the printhead driver 46 uses to operate ejectors in one or more of the printheads 22 and to control movement of the platen 14 and the printhead(s) 22 for accurate placement of the material. To remove material, the compensation processor operates an actuator 24 to move a material remover 58 to a position opposite a position on the object in the view used to identify the differences and the remover 58 is operated to remove material from the object. The material remover 58 can be, for example, a drill, a lathe, a laser, or other component configured for material removal. Thus, the system 100 can compensate for the measured errors and keep the part within tolerances during its manufacture.

Figure 2:
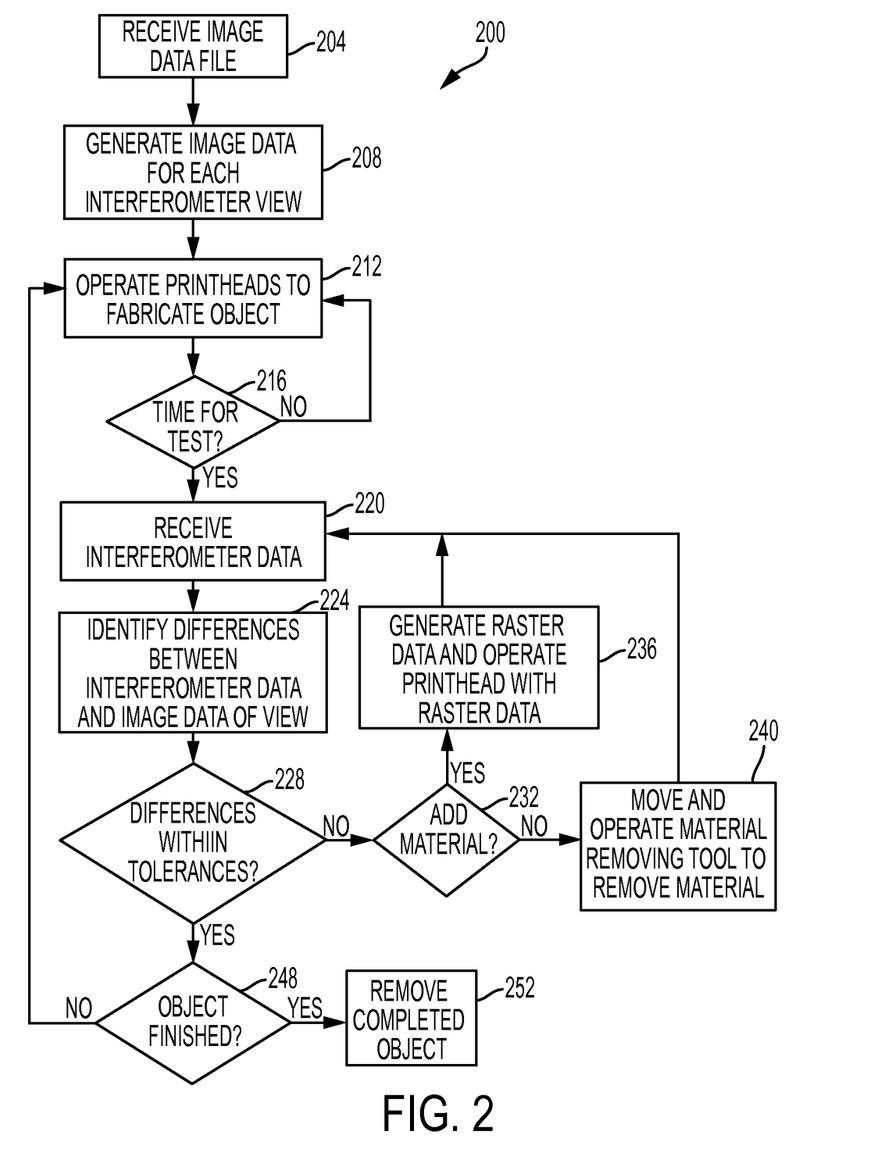
FIG. 2 is a flow diagram of a method for operating the printer of FIG. 1.

A method of operating a printer that compensates for measured errors in three-dimensional objects during their printing is shown in FIG. 2. In the description of this method, statements that a process is performing some task or function refers to a controller or general purpose processor executing programmed instructions stored in a memory operatively connected to the controller or processor to manipulate data or to operate one or more components in the printer to perform the task or function. The controllers 34, 38, and 54 noted above can be such a controller or processor. Alternatively, these controllers can be implemented with more than one processor and associated circuitry and components, each of which is configured to form one or more tasks or functions described herein.

At the beginning of an object printing process 200, the compensation processor 54 receives an image data file of the three-dimensional part to be formed, such as a CAD file (block 204). The compensation processor 54 generates image data for the views of the object that correspond to the orientations of each interferometer with respect to the position of the object on the platen (block 208). The printhead driver operates the ejectors in the printhead and controls the movement of the platen 14 and the printhead(s) 22 to fabricate the object (block 212). After a predetermined number of layers are printed (block 216), the interferometers generate and send data corresponding to the view of the object from each interferometer to the processor (block 220). The compensation processor 54 compares the data from the interferometers to the data corresponding to the view from the interferometer from the CAD file 40 and identifies the differences between these data (block 224). The compensation processor 54 uses these differences to determine whether they are within the tolerances for the object (block 228). If the differences are not within the tolerances, the processor 54 determines whether material should be added or removed from the object (block 232). If material should be added, the processor 54 generates raster data for operating the printhead to add material at the appropriate location on the object, sends the raster data to the printhead driver, which operates the printhead to eject the material at the appropriate location (block 236). If material should be removed, the processor 54 operates an actuator 24 to position the material remover opposite the appropriate location on the object where the material should be removed and operates the material remover to remove the material at the appropriate location (block 240). The processor 54 then repeats the comparison of the data from the interferometer to the object view data from the CAD file and repeats the operations to compensate for differences outside of the tolerance ranges until the tolerances are met (blocks 220 to 240). The process then continues with formation of the object with corrective action when required until no more layers are to be printed for the object (block 248) and the object is removed from the platen (block 252).

Figure 3:
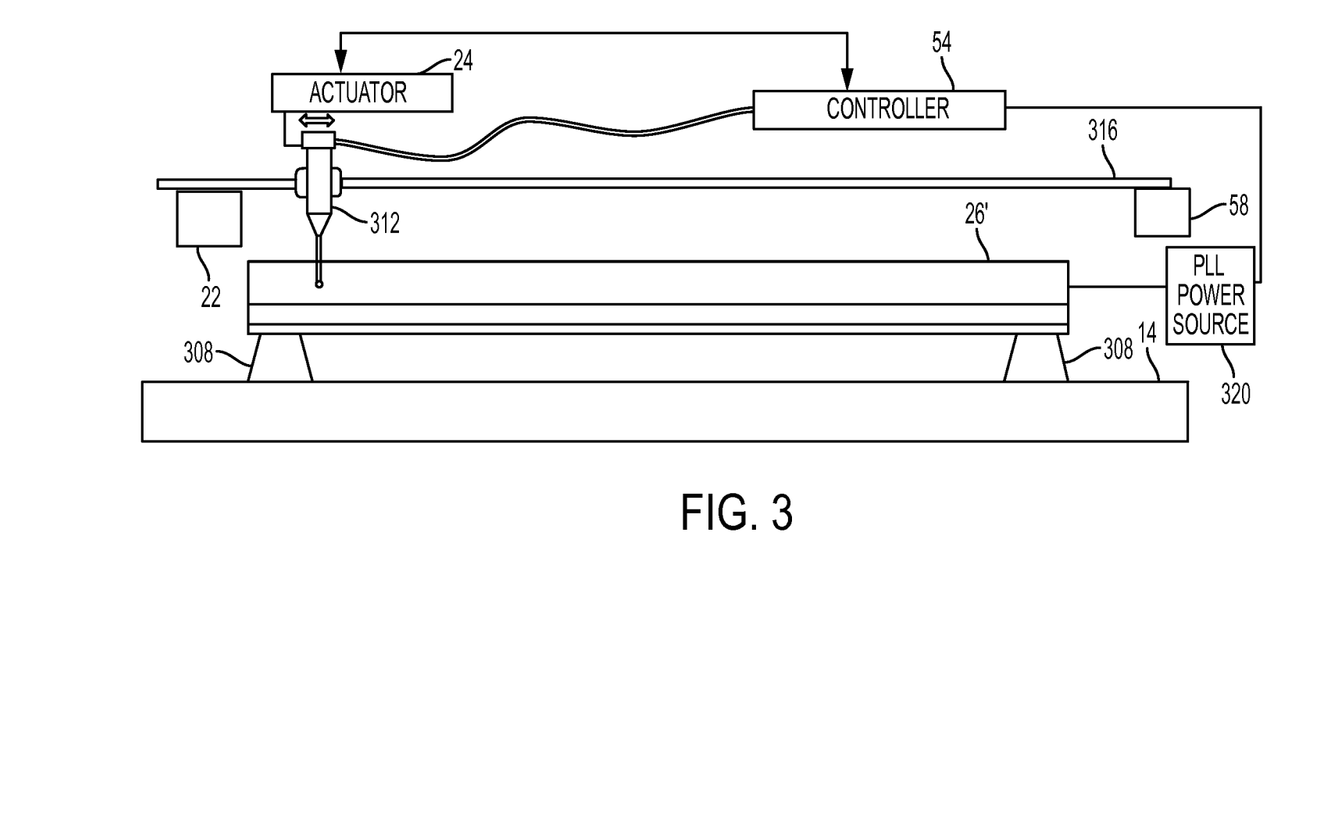
FIG. 3 is a side view of a test fixture mounted within the printer of FIG. 1 that enables tuned vibratory components to be adjusted.

Some components produced by a three-dimensional object printing system cannot be finalized with a comparison of the formed structure and various views of the object. Tuned vibratory components are components of this type. To enable adjustment of tuned vibratory components in the manufacturing environment, a test fixture 308 can be added to the platen 14 of the system 100 as shown in FIG. 3. After completion of a manufacturing process, the tuned vibratory component 26', such as a transducer, is mounted to the test fixture 308, which is positioned adjacent a constant displacement metering unit 312. In one embodiment, the constant displacement metering unit is a interferometer. The constant displacement metering unit 312 is mounted to member 316 in a manner that enables the unit 312 to slide along the member 316. The journal bearings in which the ends of the member 316 are mounted are not shown to simplify the view in FIG. 3. An actuator 24 is operatively connected to controller 54 to enable the controller 54 to operate the actuator 24 and slide the metering unit 312 bi-directionally along the member 316. The metering unit 312 is operatively connected to the controller 54 so the controller receives displacement data generated by the metering unit. A source of phase locked loop (PLL) electrical power 320 provides a stimulus to the component 26' so the component vibrates.

Figure 4:
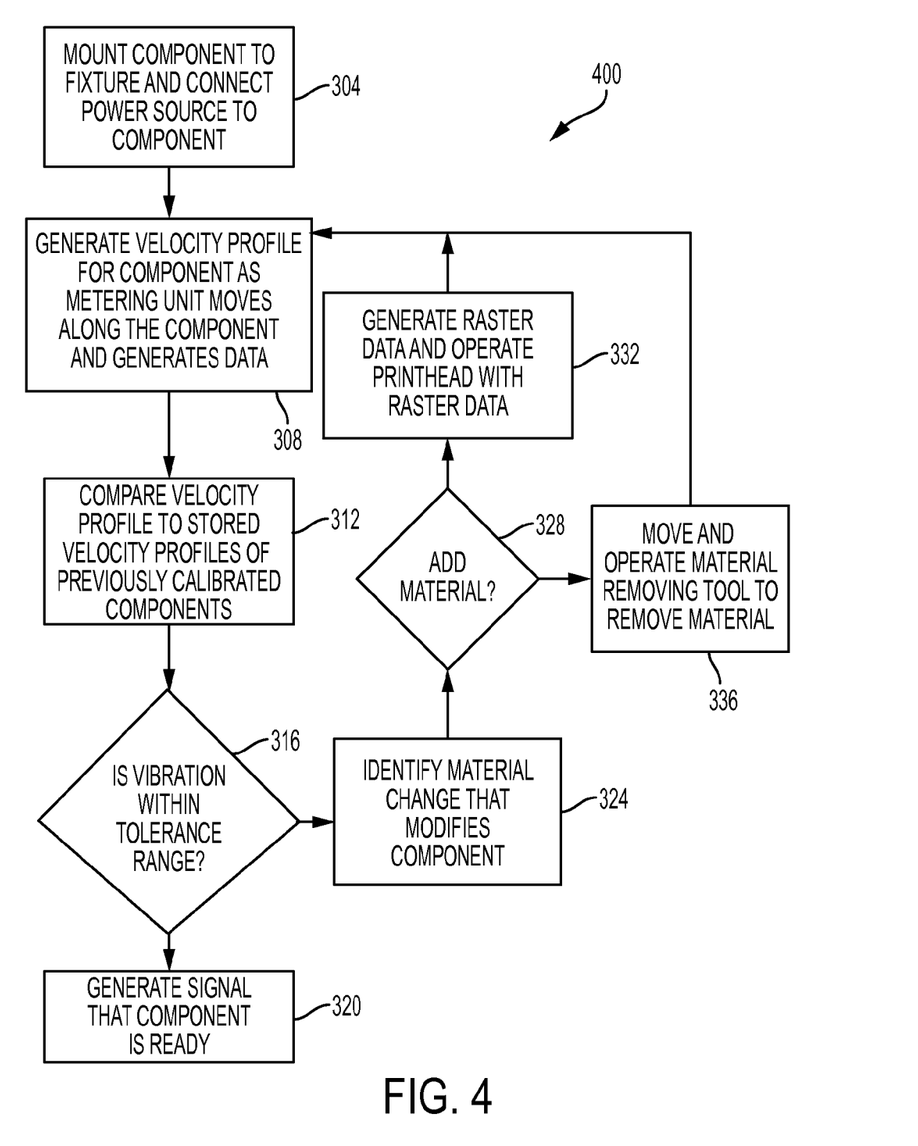
FIG. 4 is a flow diagram of a method for operating the test system of FIG. 3.

The test system of FIG. 3 can be operated with a process 400, such as the one shown in FIG. 4. The tuned vibratory component is mounted to the test fixture 308 and is connected to source of phase locked loop (PLL) electrical power source 320 to provide stimulus to the component so it begins to vibrate (block 304). The controller 54 generates a velocity profile for the tuned vibratory component with the displacement data received from the metering unit 312 (block 308). The velocity profile is compared by the controller 54 to profiles previously obtained from tests of tuned vibratory components that vibrate within a predetermined range (block 312). If the component vibrates within the range (block 316), the component has been properly formed and a signal is generated to indicate the component should be removed from the test fixture (block 320). If the component is not within the predetermined range, the profile is analyzed by the controller 224 to determine an amount of mass that needs to be added or removed from a particular location on the tuned vibratory component (block 324). If material is to be added to the component (block 328), the controller operates actuators to position ejectors opposite the particular location where material is to be added, generates the appropriate raster data, and operates the ejectors to eject material onto the tuned vibratory component (block 332). If material is to be removed from the component, the controller operates actuators to position material removers, such as the ones identified above, opposite the particular location where material is to be removed and operates the material removers to take material from the tuned vibratory component (block 336). After material is either added or removed from the component, another velocity profile of the object is generated and compared to past profiles to determine whether further adjustment is required or the component is ready for removal (blocks 308 to 316). This process continues until the component is ready for removal.

In the process described with reference to FIG. 4, the velocity along the length of the transducer is within a range, which is typically about 800 to about 1200 mm/sec. If one side of the transducer is above this range, then an amount of material is added to that side to dampen the velocity of that side so it falls below the upper limit of 1200 mm/sec. The vibration of the transducer at other locations is then measured again to determine whether the addition of the material has affected another portion of the transducer. If the velocity of another position is out of range, another appropriate adjustment is made, namely, the addition of material if the measured velocity is above the range and the removal of material if the velocity is below the lower end of the range. Data regarding the positions of the out-of-range velocities, the amount of material added or removed, and the positions affected by that addition or removal are stored in a file. The data stored in this file is used to reduce the time this iterative process arrives at a properly tuned transducer.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional object printing system comprising:
   a planar member;
   at least one ejector configured to eject material towards the planar member to form an object on the planar member;
   at least one interferometer that generates signals corresponding to distances between positions in a surface of the object being formed on the planar member, the interferometer being oriented differently than the ejector with reference to the object being formed on the planar member;
   a material remover configured to remove material from the object being formed on the planar member; and
   a controller operatively connected to the at least one interferometer, the ejector, and the material remover, the controller being configured to:
      operate the at least one ejector to form the object on the planar member;
      compare the distances between positions on the surface of the object being formed on the planar member that correspond to the signals received from the at least one interferometer to data corresponding to a plurality of views of the object being formed on the planar member;
      identify a position on the object being formed on the planar member where material is to be removed or added to the object being formed on the planar member in response to the comparison of the distances and the data corresponding to the plurality of views exceeds a predetermined threshold; and
      operate the material remover or the at least one ejector to remove or add material to the object being formed on the planar member at the identified position to modify positions on the surface of the object being formed on the planar member to positions identified in the data corresponding to the plurality of views.

2. The printer of claim 1, the controller being further configured to:
   iteratively compare the distances to the data corresponding to the plurality of views, identify the position on the object, and operate the material remover or the at least one ejector until the comparison does not exceed the predetermined threshold.

3. The printer of claim 1, the data corresponding to the plurality of view further comprising:
   computer-aided design (CAD) data of the object to be formed on the planar member.

4. The printer of claim 1, the at least one interferometer further comprising:
   a plurality of interferometers, each of the interferometers in the plurality of interferometers being oriented differently than the at least one ejector with reference to the object being formed on the planar member.

5. The printer of claim 4 wherein each interferometer in the plurality of interferometers corresponds to a view in the data corresponding to the plurality of views of the object being formed.

6. A vibratory component tuning system comprising:
   a member configured for mounting a vibratory component;
   an interferometer that generates signals corresponding to changes in a surface of the vibratory component as the vibratory component is operated to vibrate;
   an actuator operatively connected to the interferometer and configured to move the interferometer along the vibratory component mounted to the member as the vibratory component is operated to vibrate;
   an ejector configured to eject material that adheres to the vibratory component mounted to the member;
   a material remover configured to remove material from the vibratory component mounted to the member; and
   a controller operatively connected to the interferometer, the actuator, the ejector, and the material remover, the controller being configured to:
      operate the vibratory component mounted to the member;
      operate the actuator to move the interferometer along the surface of the vibratory component;

generate a velocity profile corresponding to vibration of the vibratory component at a plurality of positions along the vibratory component;

identify a position on the vibratory component where material is to be removed or added to the vibratory component; and operate the material remover to remove material or the ejector to add material to the vibratory component at the identified position to tune the vibratory component to enable the vibratory component to vibrate at a predetermined frequency and velocity set point.

7. The system of claim 5, the material remover further comprising:

a drill.

8. The system of claim 6, the ejector further comprising:

a printhead configured to eject material from a reservoir pneumatically connected to the printhead.

9. The system of claim 6, the member being further configured for mounting a transducer as the vibratory component.

10. The system of claim 6, the member being further configured for mounting and rotating the vibratory component.

* * * * *